April 17, 1928.
J. B. SCHARF
1,666,837
STORAGE BATTERY FLUSHING AND REFILLING DEVICE
Filed Jan. 31, 1927    2 Sheets-Sheet 1
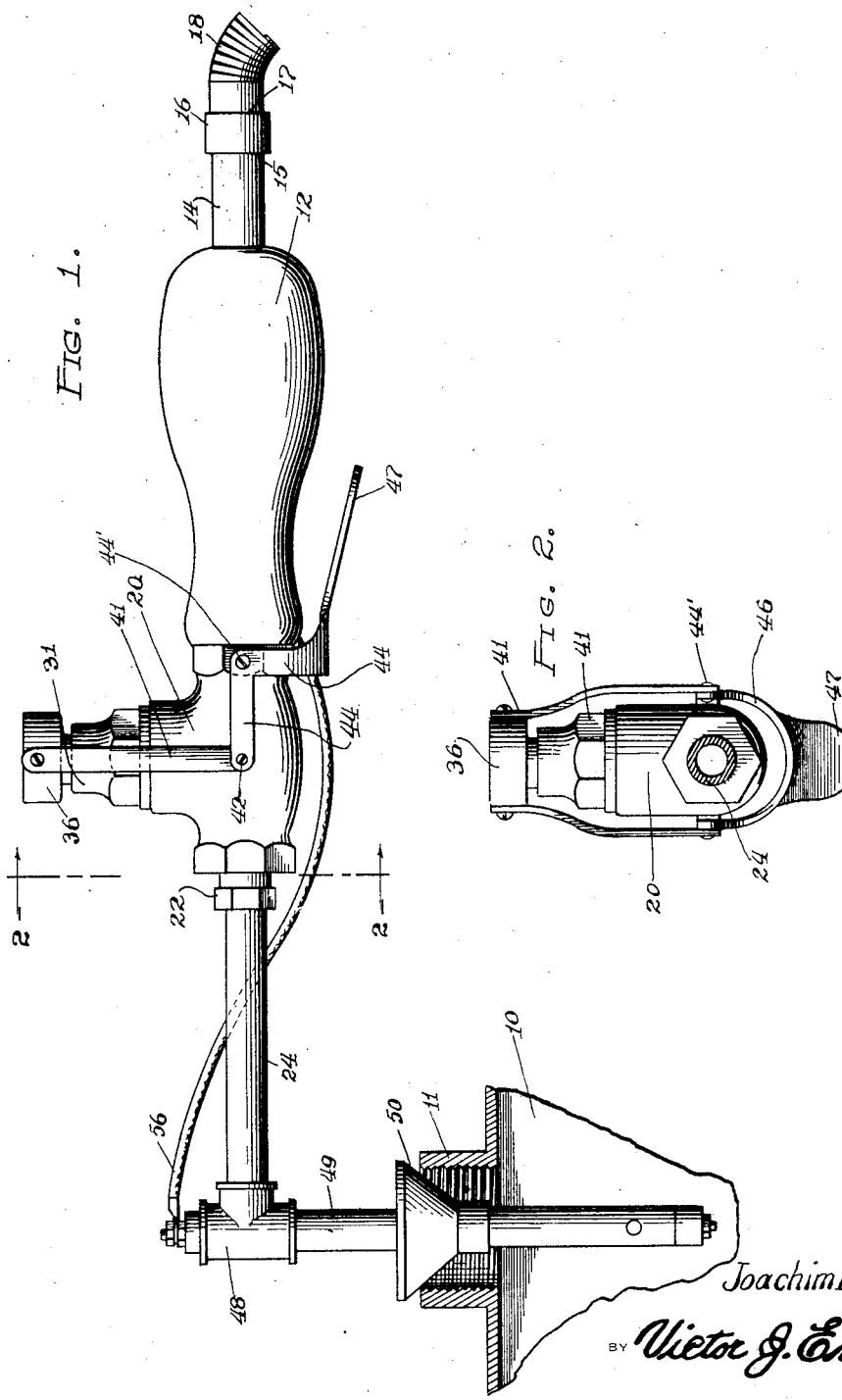
Joachim B. Scharf
INVENTOR
BY Victor J. Evans
ATTORNEY April 17, 1928.
J. B. SCHARF
1,666,837
STORAGE BATTERY FLUSHING AND REFILLING DEVICE
Filed Jan. 31, 1927    2 Sheets-Sheet 2
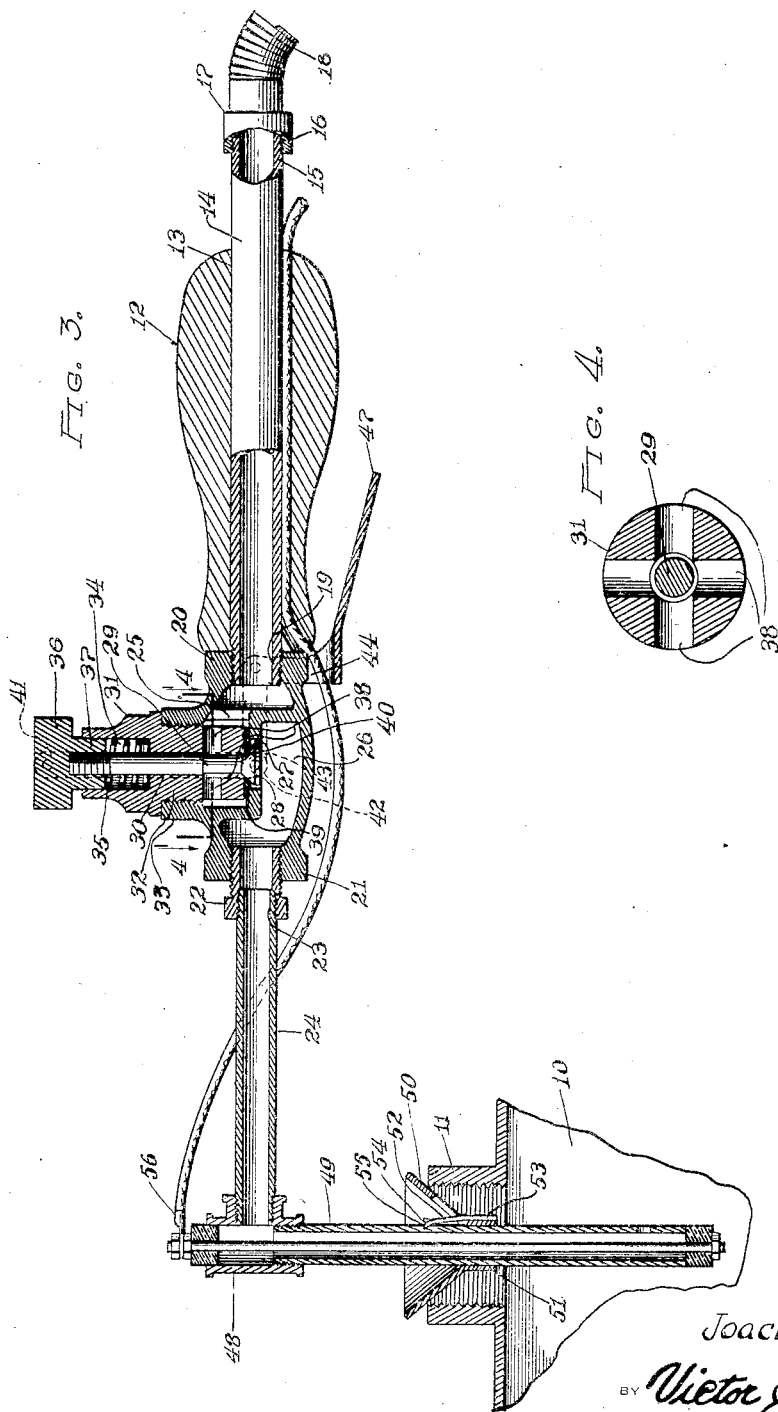
Joachim B. Scharf
INVENTOR
BY *Victor J. Evans*
ATTORNEY Patented Apr. 17, 1928.

1,666,837

UNITED STATES PATENT OFFICE.

JOACHIM B. SCHARF, OF CHICAGO, ILLINOIS.

STORAGE-BATTERY FLUSHING AND REFILLING DEVICE.

Application filed January 31, 1927. Serial No. 164,906.

This invention relates to certain novel improvements in storage battery flushing and refilling devices and has for its principal object the provision of an improved construction of this character which will be highly efficient in use and economical in manufacture.

In flushing and refilling the cells of storage batteries it is of great importance that the sulphuric acid within the cells be prevented from splashing or otherwise flowing upon the tops of the storage batteries where if such is permitted to remain, explosion might take place. It is also essential that the corrosion which ordinarily takes place upon the cell plates of storage batteries be removed before additional distilled water is admitted into the cells. It is therefore one of the many objects of this invention to provide a storage battery flusher and filling device which will, when filling or flushing, not splash or dispose the sulphuric acid within the cells upon the top of the storage battery and which during flushing will be efficient for removing the corrosion on the cell plates.

A still further object of the invention is to provide a device of the character hereinafter described which includes as a part thereof a simple combination of parts for manually controlling the flow of water through the device into the storage battery.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is a typical side elevational view of the invention;

Fig. 2 is a sectional detail view taken substantially on line 2—2 of Fig. 1;

Fig. 3 is a longitudinal vertical sectional detail view of the invention; and

Fig. 4 is a sectional detail view taken substantially on line 4—4 of Fig. 1.

Referring to the drawings 10 indicates a fragmentary sectional portion of a storage battery which includes the usual threaded nipple 11 to which is attached the cell plug (not shown) which closes passage through the nipple 11.

The preferred form of construction of my invention includes a handle 12 which has formed therein a longitudinally extending bore 13. Arranged in this bore 13 and carrying the handle 12 is a tube 14. The outer end portion 15 of the tube 14 has a threaded portion 16 adapted for connection with a nipple 17 carried by a flexible hose 18. This hose 18 is connected to a tank or faucet through which distilled water is adapted to flow, preferably under pressure through the tube 14. The inner end portion 19 of the tube 14 is threaded into one end of the valve structure 20. The other end 21 of the valve structure 20 carries a nipple 22 which is threaded to one end portion 23 of a tube 24.

The valve structure 20 includes two passages 25 and 26 communication between which is permitted through an opening 27. This opening 27 is normally closed by a valve disk 28. The valve disk 28 is carried by a valve stem 29 which is slidably mounted within a bore 30 formed in a bushing 31. The bushing 31 has a reduced threaded portion 32 which is threaded into an opening formed in the head 33 of the valve structure 20. Formed in the exterior portion of the bushing 31 is a recess 34 within which is confined a spring 35 embracing the valve stem 29. Threaded upon the exterior end of the valve stem 29 is a thumb button 36. This thumb button 36 has a reduced portion 37 which is adapted to move in the recess 34 against the action of the spring 35, said spring 35 normally holding the valve disk 32 in closing position with respect to the opening 27. The interior portion of the bushing 31 is provided with communicating openings 38. This interior portion is disposed upon a gasket 39 which prevents leakage between the chambers when the valve disk 28 is in valve closing position.

The fluid flowing through the tube 14 enters the passage 25 of the valve structure 20 and as soon as the valve disk is moved from valve closing position the fluid will pass into the intercommunicating openings 38 for passage into a port 40 normally closed by the valve disk 28 into the passage 26 to flow through the tube 24.

This valve disk is moved into and from valve closing position through the medium of manually controlled mechanism now to be described.

Pivotally connected on opposite sides of the thumb buttom 36 are depending arms 41. The lower end portions of the arms 41 are pivotally connected as at 42 to the limb portions 43 of bell cranks 44. The limb portions 45 of these bell cranks are integrally formed together by a transversely extending strip 46 which extends beneath the valve structure 20. This strip 46 has formed thereon a laterally extending portion 47 which provides a finger engaging lip.

The tube 24 has its outer end portion threaded into a T-shaped fitting 48. Depending from the fitting 48, substantially at right angles with respect to the tube 24, is a nozzle 49 adapted to project through the nipple 11 into the cell of the storage battery. Carried by this nozzle 49 intermediate its end portions is a locating head 50. This head 50 is formed frusto conical in shape and has a neck portion 51 which embraces the nozzle 49. The head 50 is detachably connected for adjustment relatively to the nozzle 49 through the medium of a spring finger 52 secured to the neck 51 as at 53. This finger 52 has a prong shaped end portion 54 which is adapted to selectively engage in aligned notches 55 formed in the nozzle 49.

If desired, there may be associated with the nozzle 49 a signal device 56 which will serve to signal when a predetermined amount of distilled water is admitted into the cells of the storage battery. This signal device is of a well known construction and need not be described herein as it in itself forms no part of my invention.

In use the user firmly clasps the handle 12 in his hand disposing his index finger under and in contact with the finger lip 47. The nozzle 49 is inserted through the nipple 11 into the cell of the storage battery a distance to dispose the head 50 in resting position upon the nipple 11. When the device is applied in this position the operator manipulates the finger lip 47 to pivot the bell cranks 44 about their pivot 44'. This pivotal movement of the bell cranks will manipulate the arms 41 to move the valve stem 29 in a direction to dispose the valve disk from valve closing position thereby to permit the flow of fluid through the tubes into the cell of the storage battery from the nozzle 49. As soon as the cell has been filled with a predetermined amount of distilled water the valve disk 28 is permitted to automatically return to valve closing position by action of the spring 35.

By forcing the fluid through the tubes and nozzle of the device under pressure it will be manifest that the cells will be efficiently flushed to remove such corrosion as has implanted itself upon the plates of the storage battery. By the use of a device as herein described it will be manifest that leakage of the sulphuric acid or distilled water upon the tops of the storage battery will be eliminated in that splashing of the water or sulphuric acid is to a great degree prevented by the head 50 which is mounted in the nipple 11 in an inverted position.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to secure by Letters Patent is:

1. In a battery filling and flushing device, a valve structure, including a movable valve disk, a valve stem carrying the valve disk and a spring control button, conduits having communication between each other controlled by said valve structure, a handle supported by one of said conduits, and means for moving said valve disk, said means including arms pivotally supported by the button, bell cranks pivotally supported by the valve structure and having corresponding limb portions pivotally connected to the arms and opposite corresponding limb portion integrally formed together, a finger lip extending laterally from the integrally formed bell cranks and disposed beneath and in longitudinal direction with respect to the handle.

2. In a battery filling and flushing device, two conduits, a discharge nozzle carried by one of said conduits, a handle carried by the other of the conduits, a valve structure connecting said conduits in communication with respect to each other, said valve structure including a valve stem operating head, and means for operating said head, said means including an operating member pivotally supported by said valve structure and having a finger gripping position extending longitudinally with respect to and beneath said handle, and means operatively connecting said member to said head.

In testimony whereof I affix my signature.

JOACHIM B. SCHARF.